SULFUR REMOVAL FROM MOLTEN MEDIA
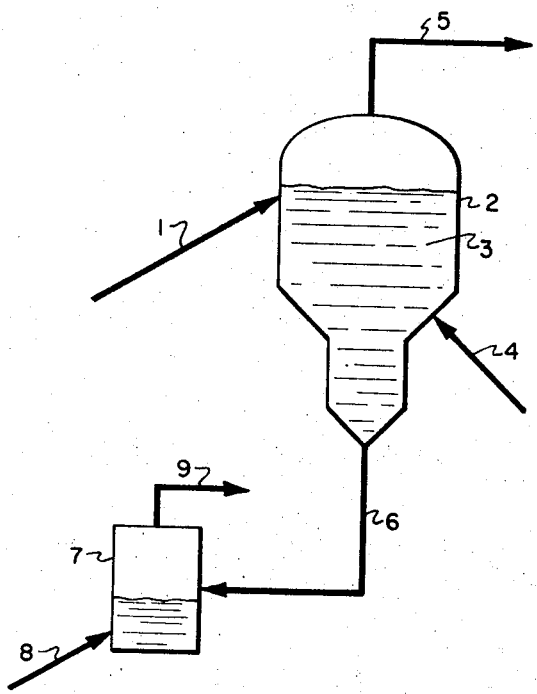

United States Patent Office 3,835,033
Patented Sept. 10, 1974

3,835,033
SULFUR REMOVAL FROM MOLTEN MEDIA
John J. Dugan and Keith C. Yao, Sarnia, Ontario, Canada, assignors to Esso Research and Engineering Company
Filed Aug. 14, 1972, Ser. No. 280,184
Int. Cl. C10g 9/34
U.S. Cl. 208—125       24 Claims

ABSTRACT OF THE DISCLOSURE

Sulfur is recovered from a molten salt mixture containing metal sulfides by contacting the metal sulfides with steam in a molten salt mixture containing a glass-forming oxide in combination with an alkali or alkaline earth metal oxide or hydroxide, including mixtures thereof, at a temperature in the range of from above about the melting point of said molten salt media to about 2000° F. The sulfur is recovered from the molten media as an essentially dry, highly concentrated, hydrogen sulfide stream. Preferably, the mole ratio of the alkali and/or alkaline earth metal oxide and/or hydroxide expressed as the oxide thereof to the glass-forming oxide is maintained in the range of below about 3 in order to significantly increase the rate of desulfurization of the molten media. In a preferred embodiment, the alkali or alkaline earth metal sulfides are present in the molten media due to contacting a carbonaceous material with a gaseous stream containing oxygen at elevated temperatures in order to gasify the carbonaceous materials to carbon oxides and to convert the sulfur present in the carbonaceous materials to alkali or alkaline earth metal sulfur oxides. The sulfur oxides predominantly in the molten media in the form of alkali or alkaline earth metal sulfates and sulfites are then reduced, for example, by carbon to their alkali or alkaline earth metal sulfide form. The carbonaceous materials such as coke or coal may be introduced into the molten media or formed in situ during the cracking of a hydrocarbon feedstock in the molten media.

FIELD OF THE INVENTION

This invention relates to removing sulfur from a molten salt media wherein the sulfur is present in the melt in the form of metal sulfides. More particularly, this invention relates to reducing the amount of sulfur in a molten salt media containing a glass-forming oxide such as an oxide of boron in combination with an alkali or alkaline earth metal oxide or hydroxide, including mixtures thereof, by contacting the alkali or alkaline earth metal sulfides with steam at a temperature in the range of from about above the melting point of the molten media to about 2000° F. In a particular embodiment of this invention, carbonaceous materials such as coal, coke and the like are introduced into a molten media containing a glass-forming oxide in combination with an alkali or alkaline earth metal oxide or hydroxide, including mixtures thereof. Thereafter, the carbonaceous materials are contacted at a temperature from above about the melting point of the melt to about 2000° F. with a gaseous stream containing oxygen, such as air, in order to gasify the carbonaceous materials to carbon oxides and to convert the sulfur present in the carbonaceous materials to alkali or alkaline earth metal sulfur oxides. The alkali or alkaline earth metal sulfur oxides, which are present in the molten media predominantly in the form of alkali or alkaline earth metal sulfates and sulfites, are then contacted with a source of carbon or other reducing agent such as hydrogen, CO, methane and the like, to reduce the metal sulfates and sulfites to their alkali or alkaline earth metal sulfide form. It has been surprisingly found that when the alkali or alkaline earth metal sulfides are contacted with steam at elevated temperatures in the range of from about above the melting point of the melt to about 2000° F. in a molen media containing a glass-forming oxide in combination with an alkali or alkaline earth metal oxide, hydroxide, or mixture thereof, that the melt is desulfurized by removing the sulfur impurity as a dry, highly concentrated hydrogen sulfide stream.

DESCRIPTION OF THE PRIOR ART

The thermal cracking of hydrocarbons at elevated temperatures to produce olefinic compounds such as ethylene by employing a molten salt such as eutectic mixtures of lithium and potassium chlorides as the heat transfer medium is well known in the art. The gasification of carbonaceous fuels in molten media such as molten alkali metal carbonates to produce a gas stream has likewise been disclosed in the art (see U.S. Pat. No. 3,252,773).

However, the molten media which has hertofore been employed to either crack hydrocarbon feedstocks or to gasify carbonaceous materials have suffered from one or more disadvantages which has resulted in limited industrial application of these processes. The difficulty primarily encounted in any molten media process for treating hydrocarbon feedstocks is the fact that the carbonaceous materials such as coke which are formed in the process were not suspended in the melt, but formed a separate phase which contaminated the liquid and gaseous products. While it has recently been suggested that this difficulty may be overcome by carrying out the hydrocarbon treating processes in a molten salt of either alkali metal carbonate or alkali metal hydroxides (see U.S. Pat. No. 3,553,279), such a molten media system suffers from the disadvantage of undergoing decomposition at operating conditions normally employed for cracking and gasifying hydrocarbon feedstocks, i.e., temperatures above about 1200° F.

A second major difficulty in conducting hydrocarbon conversion processes in molten salt media involves the removal of the sulfur compounds which become absorbed in the melt during the processing of the hydrocarbon feed stream. As described in U.S. Pat. No. 3,553,279, when an alkali metal carbonate, an alkali metal hydroxide or a mixture of these salts is empolyed in order to carry out the cracking of a hydrocarbon feedstream to produce high yields of ethylene, the molten salt serves to remove sulfur and other contaminants from the hydrocarbon feedstream in accordance with the following equation:

(I) 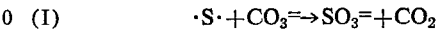  ·S·+CO₃⁼→SO₃⁼+CO₂

The continual buildup of these sulfur impurities in the melt either in the form of metal sulfates or metal sulfites, as described about, presents serious difficulties in carrying out hydrocarbon conversion processes in such molten media, necessitating, as is described in U.S. Pat. No. 3,553,279, withdrawing the contaminated molten salt containing a significant concentration of these sulfate contaminants and adding fresh molten salt to the reactor. In a commercial process for converting heavy hydrocarbon feedstreams to both liquid and gaseous products, such a procedure would be intolerable in view of the amounts of sulfur which are normally present in hydrocarbon feedstocks which are employed in hydrocarbon conversion processes such as cracking to produce olefinic products or gasification processes to form volatile gaseous products.

The absorption and recovery of sulfur in predominantly molten alkali metal carbonate systems has recently been proposed in relation to removing sulfur oxides and specifically sulfur dioxide from hot combustion gases produced by burning a sulfur-containing hydrocarbon fuel, i.e., flue gases (see U.S. Pat. Nos. 3,438,733; 3,438,734; 3,516,-796; 3,551,108; 3,438,727 and 3,438,728). These techniques for absorbing and removing sulfur from a molten carbonate system basically involve the molten alkali carbonate initially absorbing the sulfur oxides to form alkali metal sulfites or sulfates. Thereafter, the alkali metal sulfites or sulfates may be reduced with a reducing agent to form the alkali metal sulfides which are thereafter contacted with a gaseous mixture containing steam and carbon dioxide in order to form hydrogen sulfide while at the same time regenerating the alkali metal carbonates for recirculation in the process (see U.S. Pat. No. 3,438,728 and *Chemical Engineering Progress*, November, 1969, pp. 73 et seq.). Various other methods have been proposed for removing sulfur oxides in the form of elemental sulfur from molten carbonate systems such as by contacting the alkali metal sulfites with a carbonaceous material such as activated carbon in order to favor the formation of elemental sulfur or by contacting the alkali metal sulfate with a reducing agent to form alkali metal sulfide which is then contacted with the alkali metal sulfate to regenerate the alkali metal carbonate and form elemental sulfur (see U.S. Pat. Nos. 3,438,733; 3,438,734; 3,516,796 and 3,551,108).

Still another method of removing sulfur compounds from molten carbonate systems is by absorption of the sulfur dioxide in a molten alkali metal carbonate melt to form alkali metal sulfite and thereafter regenerating the absorbent and the recovery of hydrogen sulfide by a single stage regeneration wherein the sulfite containing absorbent solution is reacted with a hydrocarbonaceous material, preferably carbon and hydrogen. The hydrogen may be generated in situ by reaction of steam with a carbonaceous material.

Various molten salt processes have also been employed for desulfurizing carbonaceous fuels including the desulfurization of residual fuels and petroleum residues. A process for desulfurizing a gas oil fraction by contact with molten potassium hydroxide, an oxygen containing gas and 15 to 30 weight percent water based on total reagent has been disclosed in U.S. Pat. No. 3,440,164. In addition, a method for desulfurizing carbonaceous materials is described in U.S. Pat. No. 3,387,941, which disclosure teaches the partial desulfurization of carbonaceous materials by contacting the carbonaceous materials with the intermittent introduction of steam into a hot mixture of an oxide, carbide, hydroxide, hydride or carbonate of an alkali metal.

The prior art processes described above which remove sulfur from a molten media by reducing the metal sulfate and sulfite impurity in the melt to the metal sulfide and thereafter contacting the metal sulfide with steam in a molten oxide or hydroxide melt suffer from the fact that the desulfurization reaction is thermodynamically unfavorable at high temperatures. The contacting of an alkali metal sulfide with steam and carbon dioxide in an alkali metal carbonate melt, as described above, is feasible only at low temperatures in view of the fact that the equilibrium constant for the reaction decreases rapidly with an increase in temperature such that the reaction also becomes unfavorable above about 1000° F. Furthermore, when the alkali metal sulfide is contacted with steam and carbon dioxide in a molten alkali carbonate system, the hydrogen sulfide stream that is produced is diluted with a significant amount of unreacted carbon dioxide. This carbon-dioxide rich hydrogen sulfide stream presents an additional separation problem as well as indicating that a significant amount of carbon dioxide is required in order to remove the sulfur impurities from a molten carbonate melt system.

SUMMARY OF THE INVENTION

It has now been discovered that sulfur impurities in the form of alkali metal sulfides may be removed from a molten salt medium containing a glass-forming oxide in combination with an alkali metal oxide or hydroxide, an alkaline earth metal oxide, hydroxide or mixtures thereof, by contacting the alkali or alkaline earth metal sulfide in such a molten media with steam at a temperature in the range of from above about the melting point of the melt to about 2000° F. In addition, it has been surprisingly discovered that by maintaining the mole ratio of the alkali and/or alkaline earth metal oxide and/or hydroxide expressed as the oxide thereof to the glassforming oxide within a narrowly defined range, as will be hereinafter defined, there occurs an unexpected increase in the desulfurization rate, that is the rate at which the alkali or alkaline earth metal sulfide, when contacted with steam, is converted to hydrogen sulfide as a recoverable product. Accordingly, an improved method has been discovered for removing sulfur impurities in a specific unique molten media system, which process can be advantageously carried out at temperatures above about 800° F. while obtaining excellent desulfurization rates in the absence of employing carbon dioxide as a reagent in the desulfurization process. In addition, contacting the alkali or alkaline earth metal sulfide with steam in a molten media containing a glass-forming oxide in combination with an alkali or alkaline earth metal oxide or hydroxide not only affects the removal of sulfur from the molten media as a recoverable hydrogen sulfide stream, but results in regeneration of the alkali or alkaline earth metal oxide or hydroxide component of the melt system of the instant invention.

In a preferred embodiment of this invention, sulfur is removed from carbonaceous materials such as coke or coal by contacting the carbonaceous materials in a molten media containing a glass-forming oxide in combination with an alkalki metal oxide or hydroxide or an alkaline earth metal oxide or hydroxide, including mixtures thereof, with a gaseous stream containing oxygen, i.e., such as air, at a temperature in the range of from above about the melting point of the media to about 2000° F. in order to gasify the carbonaceous material to carbon oxides and to convert the sulfur in the carbonaceous materials to alkali or alkaline earth metal sulfur oxides. The alkali or alkaline earth metal sulfur oxides are then contacted with a reducing agent such as carbon to form alkali or alkaline earth metal sulfides and thereafter the sulfides are contacted with steam at a temperature in the range of from above the melting point of the melt to about 3000° F. in order to form hydrogen sulfide as recoverable product while at the same time effectuating the regeneration of the melt for further use in the process. In addition, it has been discovered that when the alkali or alkaline earth metal sulfides are contacted with steam in the presence of oxygen, sulfur dioxide, or an alkali or alkaline earth metal sulfite or sulfate, a portion of the sulfur impurity is removed from the melt in the form of elemental sulfur. Accordingly, it is within the purview of the instant invention to recover the sulfur impurity from the molten media system of the instant invention either in the form of an essentially dry, concentrated hydrogen sulfide stream and/or in the form of elemental sulfur.

In a still more preferred embodiment of the instant invention, a heavy hydrocarbon feedstream such as whole crude, vacuum and atmospheric residua and the like may also be treated with a glass-forming oxide melt in order to desulfurize such a hydrocarbon feedstock. In such a process, the hydrocarbon feedstock is contacted with a regenerable molten media containing a glass-forming oxide in combination with an alkali metal oxide or hydroxide or alkaline earth metal oxide or hydroxide, including mixtures thereof, at a temperature from above about the melting point of the molten media to about 2500° F. in order to form cracked hydrocarbon products and carbonaceous materials. The carbonaceous materials which are formed become suspended in the molten media during the cracking operation and are contacted with a gaseous stream containing oxygen such as air at a temperature in the range of from above the melting point of the molten media to about 3000° F. for a period of time in order to regenerate the molten media; that is, in order to gasify the carbonaceous materials to carbon oxides and to convert the sulfur in the carbonaceous materials to predominantly alkali or alkaline earth metal sulfur oxides. Thereafter, the sulfur oxides are treated in the same manner as described above; namely, the sulfur oxides predominantly in the form of alkali or alkaline earth metal sulfites or sulfates are contacted with any of the well-known reducing agents, such as carbon, carbon monoxide, methane and the like, to reduce the alkali or alkaline earth metal sulfates and sulfites to the alkali metal sulfide form. Thereafter, the sulfur can be recovered from the molten media system of the instant invention by contacting the alkali or alkaline earth metal sulfides with steam at a temperature of from above the melting point of the melt to 2000° F. in order to form a dry, concentrated hydrogen sulfide stream or elemental sulfur, as described above.

In addition to retaining sulfur during the gasification of carbonaceous materials with oxygen, the molten media of the instant invention offers the additional advantage of absorbing sulfur during the cracking of a hydrocarbon feedstock containing sulfur. Heavy hydrocarbon feedstocks such as residua and crude oils normally contain sulfur in the form of thiols, thiophenes, sulfides and the like. Accordingly, during the thermal cracking of a hydrocarbon feedstock containing sulfur, which feedstock may or may not yield significant amounts of carbonaceous material during the cracking operation such as a light virgin naphtha fraction, a major portion of the hydrogen sulfide that is normally formed during the cracking operation is retained by the melt and forms metal sulfides, particularly when the cracking process is conducted in the essential absence of steam. Furthermore, a portion of the sulfur present in carbonaceous materials is believed to be leached out of the carbonaceous material into the molten media of the instant invention, thereby effectuating a further method by which the sulfur is believed to be retained by a glass-forming melt.

In addition, as is described in U.S. Ser. No. 280,187, filed on an even date herewith, sulfur oxides predominantly in the form of sulfur dioxide can be absorbed and thereby removed from a hot combustion gas, i.e., flue gas, by contacting the hot combustion gas containing the sulfur impurities with the molten glass-forming media of the instant invention. Thereafter, the sulfur oxides which are absorbed by the melt are reduced to their sulfide form and can thereafter be treated with steam, in the same manner as described in the instant invention, to remove the sulfur impurities from the melt.

In accordance with the process of the instant invention, it has been surprisingly discovered that the facile, inexpensive method described above for desulfurizing a molten media containing sulfur impurities is due to the presence of a glass-forming oxide component in the molten media in combination with an alkali or alkaline earth metal oxide or hydroxide, including mixtures thereof. The cracking of a heavy hydrocarbon feedstock in these glass-forming oxide melts as well as the gasification of carbonaceous materials in glass-forming oxide melts is described and claimed in U.S. Ser. Nos. 186,770, 186,771, 186,773 and 186,776, all filed Oct. 5, 1971, and all now abandoned, these four copending applications being incorporated herein by reference, and they should be consulted for further details regarding the cracking, gasification and combined cracking and gasification of hydrocarbon feedstocks in glass-forming oxide melts.

The molten media of the instant invention comprises a glass-forming oxide, by which is meant an oxide of boron, silicon, aluminum, titanium, vanadium, phosphorus, molybdenum, tungsten and mixtures thereof. It has been discovered that not all oxides of primary and secondary glass-forming compounds known in the art are amenable to the process of the instant invention. Specifically, oxides of such primary glass-forming elements as germanium, arsenic and antimony have been found unsuitable for the sulfur removal process described herein in that the oxides of these elements, i.e., glass-forming oxides of germanium, arsenic and antimony, are excessively reduced to their metal state in the presence of reducing agents such as coke at temperatures which would normally be employed to reduce the metal sulfates and sulfites to their sulfide form. In addition, a secondary glass-forming oxide, namely bismuth oxide, is likewise reduced in a molten media at elevated temperatures to its metal state in the presence of carbon.

Furthermore, when low boiling hydrocarbons including certain naphtha fractions are employed as the hydrocarbon feedstock to be thermally cracked in the molten media of the instant invention, such feedstocks may contain appreciable amounts of sulfur without forming significant amounts of carbonaceous materials during the cracking operation. Accordingly, it is clearly within the purview of the instant invention to thermally crack a hydrocarbon feedstock containing sulfur in a molten media containing a glass-forming oxide in combination with an alkali metal compound in order to form cracked hydrocarbon products and hydrogen sulfide. A major portion of the hydrogen sulfide formed during the cracking operation is retained by the molten media of the instant invention, as is described above, thereby effectively removing a major portion of the sulfur impurity from the hydrocarbon feedstock.

Accordingly, the preferred glass-forming oxides which can be employed in the practice of the instant invention are selected from the group consisting of boron, silicon, vanadium, tungsten, phosphorus and mixtures thereof. The most preferred glass-forming oxide is an oxide of boron.

The glass-forming oxides are employed in combination with an alkali or alkaline earth metal oxide or hydroxide, including mixtures thereof, to comprise the molten media which is initially charged to the cracking zone. The preferred alkali metal oxides or hydroxides include sodium, potassium, lithium, cesium and mixtures thereof. The preferred alkaline earth metals which are introduced into the cracking zone in either their corresponding oxide or hydroxide form include barium, strontium, calcium and magnesium. While the alkaline earth metal oxides or hydroxides may be employed alone in combination with a glass-forming oxide, it is preferred that when employing an alkaline earth metal oxide or hydroxide in the molten media system of this invention that alkali metal oxides or hydroxides be present in order to lower the melting point of the molten media to that temperature range which is preferred for conducting the sulfur removal as well as the cracking or gasification processes described herein.

The mole ratio of the alkali metal compound, that is the mole ratio of the alkali metal(s) and/or alkaline earth metal(s) oxide(s) and/or hydroxide(s) to the glass-forming oxide(s) is an important feature of the instant invention. It has been surprisingly discovered that when the mole ratio (R number) of the alkali and/or alkaline earth metal oxide(s) and/or hydroxide(s) expressed as the oxide(s) thereof to the glass-forming oxide is below about 3 and more preferably from about 0.1 to about 3, and still more preferably from 0.5 to about 2.5, and from about 0.5 to about 2.0 when the sulfur removal process of this invention is conducted in conjunction with cracking and/or gasification of hydrocarbon feedstocks, as described above, there occurs an unexpected increase in the desulfurization rate of the molten media when the sulfur impurities present in the melt in the form of metal sulfides are contacted with steam at elevated temperatures.

As mentioned above, the mole ratio of the alkali metal compound is defined in terms of the oxide(s) of the alkali or alkaline earth metal(s) that is employed in combination with the glass-forming oxide. The basis for defining the mole ratio of the alkali metal compound in terms of its oxide form, i.e., "expressed as the oxide(s) thereof," is the fact that the alkali metal constituent of the alkali metal oxide(s), e.g., lithium oxide ($Li_2O$), alkaline earth metal oxide(s), e.g., barium oxide (BaO) and alkaline earth metal hydroxide, e.g., barium hydroxide ($Ba(OH)_2$) all possess a total number of equivalents of alkali metal or alkaline earth metal of two. The total number of equivalents of alkali metal in an alkali metal hydroxide, e.g., lithium hydroxide (LiOH), however, is one. Accordingly, it has been discovered that when an alkali metal hydroxide is employed as an alkali metal compound in combination with a glass-forming oxide to comprise the molten media of the instant invention, it is necessary to employ two moles of alkali metal hydroxide(s) for each mole of glass-forming oxide in order to achieve the same advantages exhibited by a molten media containing a glass-forming oxide in combination with one mole of either an alkali metal oxide, alkaline earth metal oxide or alkaline earth metal hydroxide. Therefore, it is evident that it is necessary to employ twice as many moles of an alkali metal hydroxide as compared to alkali metal oxide(s) or alkaline earth metal oxide(s) or hydroxide(s) in order to achieve the identical mole ratio of alkali metal compound to the glass-forming oxide. Hence, when the mole ratio of the alkali metal compound is expressed as the oxide of the particular alkali or alkaline earth metal employed, the singular effect is that the number of moles of alkali metal hydroxides that are employed in the molten media must be divided by two and then combined with the total number of moles of alkali metal oxides and alkaline earth metal oxides and hydroxides in order to determine the total number of moles of alkali metal compound expressed as the oxides that are employed in the molten media. Thereafter, the total number of moles of the alkali metal compound is divided by the total number of moles of the glass-forming oxide(s) that is present in the molten media in order to determine the mole ratio of the alkali metal compound to the glass-forming oxide component in the melt.

Still further, it has been discovered that when an oxide of boron is employed as the glass-forming oxide, that the desulfurization rate is related not only to the mole ratio of the alkali or alkaline earth metal oxide or hydroxide to the oxide of boron but, in addition, to the mole ratio of the different alkali or alkaline earth metal oxides that are employed. Accordingly, it has been found that during the gasification of carbonaceous materials such as coke with an oxidizing gas such as air in a molten media containing boron oxide, that the gasification rate and the suppression of sulfur emissions is directly related to the basicity of the molten media in accordance with the following equation:

(II) 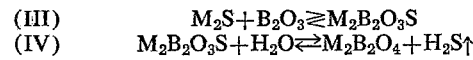

The factor before each alkali or alkaline earth metal oxide has been experimentally determined and reflects the relative basicity of each component. When the hydroxide of an alkali or alkaline earth metal is employed in combination with an oxide of boron, the identical factors described in Equation I are multiplied by the number of moles of alkali or alkaline earth metal hydroxides present in the melt, subject, however, to dividing the number of moles of an alkali metal hydroxide by two, as described above, before multiplying by the factors indicated in Equation II. The basicity (R'), which is a modified mole ratio of the alkali and alkaline earth oxides to boron oxide and is equivalent to the mole ratio of those components times their appropriate weight factors as specified in Equation II above, should be maintained at a level below about 1.5, and preferably in the range of from about 0.1 to about 1.5, and more preferably from about 0.3 to about 1.0, to achieve the advantages mentioned above relating to increasing the desulfurization rate of the molten media.

While not wishing to be bound to any particular theory, it is believed that the contacting of metal sulfides present in the molten media of the instant invention with steam at elevated temperatures in order to remove sulfur from the melt while at the same time regenerating the alkali metal sulfide containing glass-forming melt to a melt containing a glass-forming oxide in combination with an alkali metal oxide or hydroxide is believed to occur in accordance with the following equations:

(III) $M_2S + B_2O_3 \rightleftharpoons M_2B_2O_3S$
(IV) $M_2B_2O_3S + H_2O \rightleftharpoons M_2B_2O_4 + H_2S\uparrow$ wherein M represents an alkali or alkaline earth metal and wherein boron oxide, i.e., $B_2O_3$, is representative of the glass-forming oxide. It is believed that the sulfur can be removed from this melt with steam alone as the active reagent in view of the fact that the glass-forming oxide reacts with the metal sulfide to form a complex sulfur containing compound such as a thioborate, when an oxide of boron is employed as the glass-forming oxide, which thioborate can be readily hydrolyzed by steam to release hydrogen sulfide. It is to be understood that the use of the term sulfide, as employed herein to define that type of sulfur compound which must be present in the molten media of the instant invention in order to desulfurize the melt with steam, is meant to include a complex sulfur compound, such as a thio compound of the glass-forming oxide employed, i.e., thioborate, as is described in reactions III and IV above. This invention, therefore, is to be contrasted with the removal of sulfur from molten carbonate systems, as described above, wherein carbon dioxide must be employed as one of the reactants along with steam in order for a similar type of reaction to occur as shown by the following equation:

(V) $Na_2S + H_2O + CO_2 \rightleftharpoons Na_2CO_3 + H_2S$

However, in view of the fact that alkali metal carbonates decompose at elevated temperatures, i.e., temperatures above about 1200° F., in accordance with the following equation:

(VI) 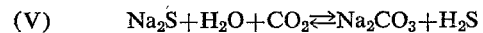

it can be seen that the melt composition of a molten carbonate melt changes as the carbon dioxide is lost to the molten media system, thus requiring that carbon dioxide be added from an external source as one of the reactants in order to maintain the melt composition to react with the metal sulfide during the desulfurization reaction. Accordingly, it can be seen that the instant invention provides a method of removing sulfur from a molten media system which is efficient in both cracking and gasifying hydrocarbonaceous materials by employing steam alone as the desulfurization reagent. In addition, in view of the fact that the removal of sulfur from a molten carbonate system with steam and $CO_2$ is thermodynamically feasible only at low temperatures in view of the fact that the reaction becomes thermodynamically unfavorable above about 1000° F., it can be seen that the process of the instant invention not only eliminates the reactant which must be employed in prior art molten media desulfurization processes, but is an effective process which can be carried out over a much wider temperature range than was heretofore possible.

In removing sulfur from a molten media containing a glass-forming oxide in combination with an alkali or alkaline earth metal oxide or hydroxide, the mole ratio of the alkali or alkaline earth metal oxide or hydroxide expressed as the oxide thereof to the glass-forming oxide, and when an oxide of boron is employed as the glass-forming oxide, the basicity of the molten media, as described above, significantly affects the rate at which the sulfur may be removed from the melt when contacted with steam. It has been found that the desulfurization rate decreases as the mole ratio of the alkali or alkaline earth metal oxide to the glass-forming oxide and the basicity of the molten media containing a glass-forming oxide increases. It should be noted, however, as is described in the copending United States patent application referred to above and incorporated herein by reference, that the gasification rate of carbonaceous materials in the molten media of the instant invention increases as the mole ratio (R number) and basicity of the molten media increases. In view of the fact that it is preferred to maintain the mole ratio of the alkali metal component expressed as the oxide thereof to glass-forming oxide component in the range of from about 1 to about 3 during the hydrocarbon cracking and/or gasification processes, as described above, it can be appreciated that it is preferred to maintain the mole ratio in the range of from about 0.5 to about 2.0 and the basicity in the range of from about 0.3 to about 1.0 to obtain the maximum benefits of gasification rate, sulfur emission suppression and desulfurization rate during integrated cracking, gasification and desulfurization processes.

The desulfurization of a molten media containing a glass-forming oxide in combination with an alkali or alkaline earth metal oxide or hydroxide with steam at elevated temperatures up to about 2000° F. can occur readily only if the sulfur in the melt is in the sulfide form. While for the purposes of the instant invention it is immaterial in what manner the sulfides, preferably alkali or alkaline earth metal sulfides, become dispersed in the melt, in a preferred embodiment of the instant invention, as described above, carbonaceous material may be gasified, i.e., burned, to carbon oxides by contacting carbonaceous materials such as coke and coal in the molten media system of the instant invention. While not wishing to be bound to any particular theory, it is believed that when a carbonaceous material such as coke or coal is contacted with a gaseous stream containing oxygen such as air in a molten media containing a glass-forming oxide in combination with an alkali or alkaline earth metal oxide or hydroxide, the sulfur present in the carbonaceous materials is released, presumably in the form of sulfur dioxide, in accordance with the following equation:

(VII)    $M_2O \cdot B_2O_3 + SO_2 \rightarrow M_2SO_3 + B_2O_3$ wherein boron oxide is shown as the glass-forming oxide and wherein M defines an alkali or alkaline earth metal. The alkali or alkaline earth metal sulfite is thereafter believed to disproportionate in accordance with the following equation:

(VIII)    $4M_2SO_3 \rightarrow 3M_2SO_4$

In addition, in view of the fact that these sulfur reactions in the glass-forming melts are being conducted in the presence of oxgen, the following oxidation reaction is also believed to be occurring:

(IX)    $2M_2SO_3 + O_2 \rightarrow 2M_2SO_4$ $M_2S + 2O_2 \rightarrow M_2SO_4$

Accordingly, the sulfites, present in an oxidizing atmosphere during the contacting of carbonaceous materials with oxygen during the gasification step are transformed to their sulfate species and are thereafter reduced to metal sulfides by the presence of carbonaceous materials such as coke which are constantly being formed during the gasification, i.e., burning, reaction in the following manner:

$$M_2SO_4 + 2C \xrightarrow{1500°F.} 2CO_2 + M_2S$$

$$M_2SO_4 + 4C \longrightarrow 4CO + M_2S$$

In addition to being reduced in situ with the carbonaceous materials as described in the above reactions, the metal sulfates may also be reduced with a number of reducing agents such as hydrogen, carbon monoxide, methane, ethane and the like. Thereafter, the metal sulfides may be contacted with steam at elevated temperatures, i.e., 1500° F., in the molten media system of the instant invention in order to remove the sulfur impurity from the melt as a dry, concentrated hydrogen sulfide stream while at the same time regenerating the molten media to a glass-forming oxide in combination with an alkali or alkaline earth metal oxide in accordance with the following equation:

(XI)    $M_2B_2O_3S + H_2O \rightarrow M_2B_2O_4 + H_2S\uparrow$

Further, when the metal sulfide is contacted with steam at elevated temperatures in the presence of an alkali or alkaline earth metal sulfate, sulfite, sulfur dioxide, or oxygen, elemental sulfur may be formed. It is believed that the hydrogen sulfide formed in situ reacts with oxygen, sulfur dioxide, an alkali or alkaline earth metal sulfate or sulfite, to form elemental sulfur in accordance with the following reactions:

(XII)    $2H_2S + O_2 \rightarrow 2S + 2H_2O$
$2H_2S + SO_2 \rightarrow 3S + 2H_2O$
$H_2S + M_2SO_4 \rightarrow S + M_2SO_3 + H_2O$
$3H_2S + M_2SO_3 \rightarrow 3S + M_2S + 3H_2O$ As discussed above, the sulfur absorption, as well as the sulfur regeneration of the molten media to a glass-forming oxide and an alkali or alkaline earth metal oxide can be conducted at a temperature of from above about the melting point of the molten medium to about 2000° F., and preferably at a temperature in the range of from about 1200° to about 2000° F. and more preferably from about 1200° to about 1600° F.

BRIEF DESCRIPTION OF THE DRAWING

This invention will be more clearly understood by reference to the accompanying drawing, which drawing shows a schematic flow diagram illustrating the gasification in the molten media of the instant invention and the absorption and recovery of sulfur impurities from the molten media, along with the attendant regeneration of the molten media.

Referring to the drawing, carbonaceous materials in the form of coal of various grades, polynite, lignite coal, coke of various types such as coal coke, petroleum coke, peat, graphite, charcoal and the like, is passed via line 1 into a burner vessel 2. The carbonaceous materials such as coke which are passed via way of line 1 may have been produced in situ during the cracking of a hydrocarbon feedstock such as crude oils, reduced crude, atmospheric and vacuum residua and the like, in a molten media containing a glass-forming oxide in combination with an alkali or alkaline earth metal oxide or hydroxide at temperatures from about the melting point of the melt to about 2000° F. The carbonaceous materials, which may have been formed in situ as heretofore described or in the form of various types of coal or coke, contain from about 1 to about 10 weight percent sulfur and are contacted in the burning reactor 2 with a molten media 3 containing a glass-forming oxide in combination with an alkali or alkaline earth metal oxide or hydroxide, as described above. Most preferably, an oxide of boron is employed as the glass-forming oxide and lithium and sodium oxide or hydroxide are employed as the alkali oxide component in a mole ratio of from about 70 moles of lithium oxide to about 30 moles sodium oxide, with a mole ratio of alkali metal oxide to the oxide of boron in the range of from about 0.5 to about 2, such that the basicity of the molten media is in the range of from about 0.3 to about 1.0.

The carbonaceous materials which become suspended uniformly throughout the melt in the burner vessel 2 are thereafter contacted with a gaseous stream containing oxygen which is introduced into the burner vessel 2 via way of line 4. The amount of oxygen which must be present in the gaseous stream in order to effectuate the burning, i.e., gasification, of the carbonaceous materials is in the range of from about 1 to about 100 weight percent oxygen, and more preferably from about 10 to about 25 weight percent oxygen. Normally, the gaseous stream containing oxygen is passed through the melt at a rate of from less than about 0.01 w./w./hr. (weight of oxygen/ weight of molten media/hour) to about 100 w./w./hr. More preferably, the rate at which the gaseous stream is passed through the molten media of the instant invention is in the range of from about 0.01 w./w./hr. to about 10 w./w./hr. While steam or carbon dioxide, either alone or in mixture with a gaseous stream containing oxygen may also be employed as a reagent to gasify the carbonaceous materials, it is preferred to introduce air via way of line 4 in order to burn the carbonaceous materials to carbon oxides, and thereby regenerating the melt while at the same time liberating the sulfur present in the carbonaceous materials, which sulfur impurities, believed to be in the form of sulfur oxides, are absorbed by the melt as described above.

The specific gasification rate of the carbonaceous materials in the molten media, as defined by the amount of carbonaceous material which is gasified per hour per cubic foot of the molten media, is dependent upon the temperature at which the gasification process is carried out as well as the residence time of the oxygen-containing gas, the concentration of carbonaceous materials in the molten media and the feed rate of the oxygen containing gas into the media. The carbon gasification rate increases as the temperature of the melt, the concentration of the carbonaceous materials and the feed rate of the oxygen containing gas increase. Preferably, the concentration of carbonaceous materials in the molten media is maintained in the range of from about 0.01 to about 60 weight percent, and more preferably from about 1.0 to about 20 weight percent, in order to effect a rapid gasification thereof. The temperature at which the gasification reaction, i.e., burning reaction, is carried out is preferably above about 1400° F., more preferably in the range of from about 1400° to about 1800° F.

The combustion products formed during the contacting of the carbonaceous materials in the molten media with an oxygen containing gas consisting primarily of carbon dioxide, carbon monoxide and steam pass overhead from burning zone 2 and are removed from the burning zone via way of line 5 and are vented to the atmosphere.

Periodically, due to a sulfur buildup in the melt, primarily in the form of sulfates and sulfites corresponding to the alkali or alkaline earth metals employed in the molten media system, it becomes necessary to remove the sulfur impurities present as sulfates and sulfites from the molten media. Accordingly, a stream of molten media containing a high concentration, normally in the range of from about 0.5 to about 10 weight percent of sulfur, is removed from the burner vessel 2 via way of line 6 and passed into a sulfur recovery zone 7. The alkali or alkaline earth metal sulfates and/or sulfites are then reduced in the sulfur recovery zone by contacting the alkali metal sulfates or sulfites with a well-known reducing agent such as carbon, hydrogen, carbon monoxide, methane, ethane, propane, and the like, in order to form alkali or alkaline earth metal sulfides. Alternatively, before passing the molten media stream containing the alkali or alkaline earth metal sulfates or sulfites into the sulfur recovery zone 7, the molten media stream containing the alkali metal sulfates or sulfites may first be passed through a reducer (not shown) wherein the alkali or alkaline earth metal sulfates or sulfites are contacted with a reducing agent such that the sulfur impurity is present in the form of alkali or alkaline earth metal sulfides when introduced into the sulfur recovery zone 7. In either event, the alkali or alkaline earth metal sulfides are thereafter contacted in the sulfur recovery zone with steam which is introduced via way of line 8 in order to form a dry, concentrated hydrogen sulfide stream which is collected and passes overhead from the sulfur recovery zone 7 via way of line 9. The hydrogen sulfide-rich stream passing overhead from the sulfur recovery zone via way of line 9 normally contains from about 2 to about 90 volume percent hydrogen sulfide and 10 to about 98 volume percent steam. Thereafter, the steam is condensed and the dry hydrogen sulfide stream can be passed to a Claus plant for sulfur recovery.

As mentioned above, contacting the alkali or alkaline earth metal sulfides with steam not only serves to remove the sulfur impurity from the melt, but to regenerate the alkali or alkaline earth metal sulfide to its original alkali or alkaline earth metal oxide or hydroxide form in the molten media. The amount of steam which need be employed in order to effectuate the removal of the sulfur from the molten media is in the range of from about 1 to about 500 moles of steam per mole of sulfide per hour, and preferably from about 5 to about 100 moles of steam per mole of sulfide per hour. While the steam is the active reagent in effectuating the removal of the sulfur from the molten media of the instant invention, the gaseous stream containing steam may include other substituents such as nitrogen, carbon dioxide, carbon monoxide, and light hydrocarbons, such as hydrogen, methane and the like. These diluents such as carbon monoxide, carbon dioxide and the like are inert in that they are not a reactant in the desulfurization of the molten media of the instant invention with steam. Nevertheless, such inert diluents admixed with the steam may effect to a very limited degree the basicity of the molten media of the instant invention, thereby slightly affecting the desulfurization rate, as mentioned above. Accordingly, it is preferred to contact the alkali or alkaline earth metal sulfide with a gaseous stream containing from about 10 to about 100 mole percent steam, and more preferably from about 50 to about 100 mole percent steam.

As mentioned above, one of the advantages of the instant invention is that the sulfur can be removed from the molten media of the instant invention at elevated temperatures, thereby alleviating the necessity of lowering the temperature of the molten media for removing the sulfur impurities as required by prior art processes described above. Accordingly, it is preferred to contact the steam with the alkali metal sulfide in the molten media of the instant invention at a temperature in the range of from about the melting point of the melt up to about 2000° F., and more preferably in the range of from about 1200° to about 2000° F. The pressure at which the reactions are carried out in the sulfur recovery zone and in the cracking and gasification zones is not critical and may vary widely; however, atmospheric or very nearly atmospheric pressure is preferred.

Periodically, it will likewise be necessary to treat the molten media in order to remove trace metals and ash which have accumulated in the melt. Accordingly, a stream of the melt with a reduced sulfur content is withdrawn and passed to an ash recovery zone, not shown, wherein the ash is separated from the melt by dissolution in water.

While the initial charge of the molten media to the cracking, gasification and/or sulfur recovery zones may consist solely of an alkali or alkaline earth metal oxide or hydroxide in combination with a glass-forming oxide, as described above, it is to be understood that the cracking and gasification of a heavy hydrocarbon feedstock in such a molten media in accordance with the processing scheme disclosed above will necessarily result over a prolonged period of time in varying the overall composition of the melt. For example, during the gasification when an oxygen containing gas is employed to gasify the carbonaceous materials present in the melt, a portion of the carbon dioxide that is formed during combustion, i.e., the gasification reaction, is absorbed by the melt. A fraction of this portion of carbon dioxide that is absorbed by the melt forms a carbonate in the melt, and predominantly an alkali or alkaline earth metal carbonate depending upon the specific alkali or alkaline earth metal oxide or hydroxide that is employed as the alkali or alkaline earth metal component of the molten media of the instant invention. The extent of the absorption of carbon dioxide by the molten glass media and thus the amount of carbonate that is formed in the melt of the instant invention is a function of the mole ratio of the alkali metal component to the glass-forming component, the specific alkali metal component employed, as well as the temperature of the melt and the carbon dioxide partial pressure existing over the bed of the molten media. As mentioned above, after a prolonged period of conducting the gasification process in the molten media of the instant invention such as will occur in a commercial unit, an equilibrium carbonate concentration will exist in the melt. The equilibrium carbonate concentration in any glass-forming melt will generally increase as the mole ratio of alkali metal oxide or hydroxide to glass-forming oxide increases, as the molecular weight of the cation increases, i.e., a melt containing potassium will absorb more carbon dioxide than a melt containing sodium, and a melt containing sodium will absorb more carbon dioxide than a melt containing lithium. The carbonate concentration predominantly in the form of alkali or alkaline earth metal carbonates in molten media of the instant invention is preferably kept to a minimum and, depending on the factors indicated above, will comprise below about 30 weight percent of the melt, preferably below about 20, and more preferably below about 15 weight percent of the melt.

In addition, it should be noted that the presence of alkali and alkaline earth metal sulfides, sulfates, sulfites, carbonates as well as ash components in the molten media of the instant invention will effectively alter, to a slight degree, the mole ratio of the alkali or alkaline earth metal oxide or hydroxide component to the glass-forming oxide component, as well as the basicity from the initial mole ratio and/or basicity of the molten media that was initially charged to the cracking zone. For example, the existence of an equilibrium carbonate concentration in the molten media as well as the presence of metal sulfates and sulfides will effectively lower, to a slight degree, the initial mole ratio of alkali or alkaline earth metal oxide component to the glass-forming component, which was charged to the cracking zone. Accordingly, the critical mole ratios, as well as the basicity, disclosed and claimed herein defines that mole ratio(s) of the alkali and alkaline earth metal oxide to the glass-forming oxide or hydroxide and basicity that must be maintained in the molten media in the sulfur recovery zone as well as in the cracking and gasification zones, in the presence of the above-mentioned carbonate and sulfur compounds and ash components, in order to obtain the advantages of the instant invention. By this is meant that after continuous cracking and gasification operations wherein a buildup of contaminants such as sulfur compounds, coke, ash and the like occurs in the melt, the mole ratio of the alkali metal compound to glass-forming compound does not include that amount of alkali metal compound that is present in these contaminants. Accordingly, due to the buildup of these contaminants in the melt and the loss, to a slight degree, of a small amount of alkali metal compound and thus a slight reduction in the mole ratio of the alkali metal compound to the glass-forming compound, it may be necessary to add additional amounts of alkali metal compound to the melt in order to maintain a specific mole ratio of the alkali metal compound to the glass-forming oxide in the melt.

This invention will now be further described with reference to the following examples.

EXAMPLE 1

Sulfur Absorption

A number of experiments were conducted wherein sulfur containing fluid coke was contacted with a gaseous stream containing air in a molten medium containing an oxide of boron as the glass-forming oxide and lithium oxide and potassium oxide as the alkali oxide component of the melt. In order to determine the degree of sulfur absorption, the amount of sulfur compounds in the effluent gas was measured with a Dohrmann Microcoulometer. The data in Table I indicates that the sulfur dioxide concentration in the effluent gas is low in view of the fact that most of the sulfur dioxide produced during burning is absorbed by the melt.

TABLE I

Melt: 225 g. borate; Temperature: 1,500° F.
Air feed rate: 2 STP l./min.;
Reactor: 1.6″ ID silicon carbide
Coke: 4 wt. percent fluid coke containing 4.5% sulfur

| Melt | Li/Na or K cation ratio | R No. | Basicity, R' | $SO_2$ concentration in effluent, v p.p.m.[1] | Oxygen conversion, percent |
|---|---|---|---|---|---|
| Li/Na | 72/28 | 1.6 | 0.60 | 160 | 26 |
| Li/K | 64/36 | 1.6 | 0.76 | 48 | 58 |
| Li/K | 78/22 | 2.0 | 0.80 | 25 | 87 |
| Li/Na | 80/20 | 2.0 | 0.68 | 140 | 43 |

[1] After 10 minutes on stream.

EXAMPLE 2

Reduction of the Metal Sulfate and Sulfite

This example indicates that the metal sulfates are reduced to metal sulfides by employing coke as a carbonaceous material or by employing carbon monoxide in the molten media of the instant invention.

The reduction of an alkali metal sulfate in a glass-forming oxide melt of the instant invention was conducted by introducing 2.25 weight percent sulphur as sodium sulfate in a molten medium containing boron oxide as the glass-forming oxide and lithium and sodium oxides as the alkali metal oxide. The alkali metal sulfate was treated with 3.8 weight percent coke such that the initial coke-alkali metal sulfate mole ratio was 4:1.

TABLE II

Melt: 400 g. Li/Na borate (60/40)
$Na_2SO_4$ initial: 44.4 g.
Reactor: 1.5″ ID graphite
Coke: 17 g. fluid coke
Basicity (R')=0.42
Mole ratio (R No.)=1

| Melt temp., ° F | 1,350 | 1,450 | 1,550 |
|---|---|---|---|
| Average reduction rate, percent min | 0.15 | 0.8 | 1.6 |

TABLE III

Melt: 400 g. Li/K borate (53/47)
$Na_2SO_4$ initial: 44.4 g.
Reactor: 1.5″ ID graphite
CO feed rate: 100 cc./min.
Basicity (R')=0.56
R No.=1
Reaction rate measured at 20% sulfate conversion

| Melt temp., ° F | 1,450 | 1,550 |
|---|---|---|
| Reduction rate, percent/min | 0.16 | 0.24 |
| CO conversion, percent | 45 | 59 |

As can be seen from the results as shown in Tables II and III, the reduction of the metal sulfates to sulfides increases as the temperature of the molten media increases from 1450° F. to 1550° F.

EXAMPLE 3

Reduction of Metal Sulfate with Methane

This example indicates that metal sulfates may be reduced to metal sulfides by employing methane as the reducing agent.

TABLE IV

Melt: 400 g. Li/Na borate (68/32)
$Na_2SO_4$ initial: 44.4 g.
$CH_4$ feed rate: 800 cc./min.
Basicity (R')=0.53
R No.=1.4

| Melt temp., ° F | 1,450 | 1,550 |
|---|---|---|
| Reduction rate, percent/min | 1.0 | 2.5 |
| $CH_4$ conversion, percent | 6 | 12 |

As can be seen from the results in Table IV, the reduction rate increases as the temperature of the molten media increases.

EXAMPLE 4

Contacting an Alkali Metal Sulfate Melt with Steam

A number of experiments were conducted wherein an alkali metal sulfate was contacted with steam at elevated temperatures in the presence as well as in the absence of the molten media of the instant invention in both graphite and Vycor glass reactors.

TABLE V

Weight ratio of $Li_2SO_4/Na_2SO_4=43/57$
Steam feed rate=0.5 g./min.
Melt: Li/Na borate (60/40; R'=0.42)
R No.=1

| Melt, g. | Sulfate, g. | Temp., °F. | Reactor | Desulfurization rate, percent/min. |
|---|---|---|---|---|
| 225 | 225 | 1,300 | Graphite | 0.01 |
| 225 | 30 | 1,400 | Vycor | 0.0 |

As can be seen from the results shown in Table V, both in the presence and in the absence of the molten media of the instant invention sulfur cannot be removed by contacting an alkali metal sulfate with steam at elevated temperatures.

EXAMPLE 5

Effect of Melt Composition on Sulfur Removal

This example indicates that the mole ratio of the alkali metal compound (R number) and the basicity of the molten media of the instant invention significantly affects the removal of sulfur when the alkali metal sulfides are contacted with steam in accordance with the process of the instant invention. In this example, an oxide of boron was employed as the glass-forming oxide.

TABLE VI

Melt: 225 g. borate
$Na_2S$: 30 g.
$H_2O$ feed rate: 0.5 g./min.
Temp.: 1,400° F.

| Cations | Li/Na+K cation ratio [1] | Mole ratio R No. | Basicity R' | Desulfurization rate, percent/min. | Initial steam conversion, percent |
|---|---|---|---|---|---|
| Li/Na | 0.68 | 0.85 | 0.39 | 5.87 | 80.7 |
| Li/Na | 0.72 | 1.0 | 0.46 | 3.64 | 50.3 |
| Li/Na | 1.10 | 1.6 | 0.67 | 1.17 | 16.2 |
| Li/Na | 1.11 | 1.8 | 0.75 | 0.63 | 8.7 |
| Li/Na | 1.14 | 2.2 | 0.92 | 0.21 | 3.0 |
| Li/Na | 1.17 | 3.0 | 1.26 | 0.15 | 1.4 |
| Li/Na | 1.01 | 1.0 | 0.42 | 5.46 | 74.8 |
| Li/Na | 1.21 | 1.2 | 0.48 | 4.99 | 68.0 |
| Li/Na | 1.43 | 1.4 | 0.54 | 2.43 | 33.6 |
| Li/Na | 1.59 | 1.6 | 0.60 | 2.20 | 30.4 |
| Li/Na | 2.05 | 1.8 | 0.63 | 1.68 | 23.1 |
| Li/Na | 2.28 | 2.0 | 0.69 | 1.09 | 15.0 |
| Li/K | 0.67 | 0.85 | 0.49 | 2.91 | 40.2 |
| Li/K | 0.77 | 1.0 | 0.56 | 2.01 | 27.7 |
| Li/K | 0.90 | 1.4 | 0.75 | 0.62 | 8.6 |
| Li/K | 1.28 | 1.6 | 0.76 | 0.69 | 8.0 |
| Li/K | 1.62 | 1.8 | 0.79 | 0.40 | 5.5 |
| Li/K | 2.10 | 2.0 | 0.80 | 0.68 | 9.3 |
| Li | 100/0 | 2.0 | 0.50 | 3.12 | 42.8 |
| Na | 0/100 | 2.0 | 1.34 | 0.06 | 0.7 |

[1] Moles Li to 1 mole of Na+K.

As can be seen from the results as shown in Table VI, the desulfurization rate decreases as the mole ratio, and more specifically, as the basicity of the molten media increases.

EXAMPLE 6

Effect of Glass-forming Oxide on Sulfur Removal

A number of experiments were conducted relating to the high temperature removal of sulfur from molten media containing sodium sulfide and alkali metal oxides in combination with several glass-forming oxides.

TABLE VII

Melt: 225 g.
Steam feed rate: 0.5 g./min.
Sulfur source: 30 g. $Na_2S$
Temp.: 1,400° F.
Reactor: Graphite

| Melt | Glass-forming oxide | R No. | Desulfurization rate, percent/min. | Initial steam conversion, percent |
|---|---|---|---|---|
| Na phosphate | Primary | 1.0 | 2.58 | 23.5 |
| Na borosilicate | do | 0.44 | 4.09 | 56.3 |
| Li/Na borate | do | 1.2 | 4.99 | 68.0 |
| Li/Na molybdate | Secondary | 1.0 | 0.05 | 0.7 |
| Do | do | 0.5 | 0.00 | 0.0 |
| Na tungstate | do | 1.0 | 0.12 | 1.7 |
| Li/Na tungstate | do | 0.5 | 1.57 | 21.5 |
| Na antimonate | do | 1.0 | | |
| Na vanadate | do | 1.0 | 0.33 | 4.4 |
| K vanadate | do | 0.5 | 0.73 | 9.3 |
| $Bi_2O_3$ | do | 0 | | |

As can be seen from the results as shown in Table VII, other glass-forming oxides in addition to boron oxide are also effective in promoting melt desulfurization.

EXAMPLE 7

Effect of the Presence of Carbon Dioxide along with Steam in Removing Sulfur from Glass-forming Melts This example indicates that the presence of carbon dioxide along with steam contributes little in high temperature sulfur recovery from the molten media systems of the instant invention.

TABLE VIII

Reactor: Vycor Glass
Melt: 225 g. Li/K Borate (50/50)
$Na_2S$: 30 g.
$H_2O$ Feed Rate: 0.75 g./min.
Basicity, R': 0.58
R No.: 1
Temperature: 1400° F.

| $CO_2$ Feed Rate mmoles/min. | Rate of $H_2S$ Formation, 35 Min. on Stream, mmoles/min. |
|---|---|
| 2.9 | 6.57 |
| 5.9 | 5.25 |
| 8.7 | 6.15 |

As can be seen from the results as shown in Table VIII, the carbon dioxide feed rate was increased, from 2.9 mmoles/min. to 8.7 mmoles/min., the rate of hydrogen sulfide formation was not significantly affected. Accordingly, while carbon dioxide may be employed as an inert diluent along with the steam in order to remove the sulfur from the molten media systems of the instant invention, it can be seen that the carbon dioxide does little to effectuate the removal of sulfur from the molten media systems of this invention.

EXAMPLE 8

Sulfur Removal from a Carbonate Melt with Steam

This example shows that in removing sulfur in a molten carbonate melt wherein an alkali metal sulfide is contacted with steam and carbon dioxide, carbon dioxide is one of the reactants and must be added along with steam in order to effectuate the removal of sulfur from the molten carbonate melt.

TABLE IX

Melt: 225 g. Li/Na/K carbonate eutectic
$Na_2S$: 30 g.
Temp: 900° F.
Steam feed rate: 0.5 g./min.
Reactor: Vycor glass or graphite

| $CO_2$ feed rate, mmoles/min. | Desulfurization rate, percent/min. | Initial steam conversion, percent |
|---|---|---|
| 0 | 0.17 | 2.0 |
| 8.9 | 0.19 | 2.7 |
| 29.7 | 1.55 | 21.5 |

As can be seen from the results as shown in Table IX, the desulfurization rate of a carbonate melt with steam alone was 0.17% per minute. It is believed that this desulfurization rate was obtained in view of the fact that carbon dioxide was being supplied by the decomposition of the melt in accordance with the following equation:

$$M_2CO_3 \rightarrow M_2O + CO_2$$

Thus, on a long-term basis, carbon dioxide must be added from an external source in order to maintain the melt composition and to react with the alkali metal sulfide during the desulfurization reaction. High desulfurization rates could only be obtained when large amounts of carbon dioxide were used with the steam.

EXAMPLE 9

Contacting an Alkali Metal Sulfide with Hydrogen in a Glass-forming Oxide Melt

This example indicates that when an alkali metal sulfide is contacted with hydrogen, a molten media containing a glass-forming oxide in accordance with the process of the instant invention, essentially no sulfur removal from the molten media system of the instant invention occurs.

TABLE X

Melt: 225 g. Li/K Borate (50/50)
Reactor: Graphite
Temperature: 1400° F.
$Na_2S$: 30 g.
Basicity, R': 0.20, R No.: 1.2

| $H_2$ Feed Rate, ml./min.: | Desulfurization Rate, percent/min. |
|---|---|
| 200 | 0.01 |

EXAMPLE 10

Temperature Effect on Sulfur Removal

TABLE XI

Melt: 225 g. borate
$Na_2S$: 30 g.

| Melt | Basicity, R' | Temp., °F. | R No. | Steam feed rate, g./min. | Desulfurization rate, percent/min. | Initial steam conversion, percent |
|---|---|---|---|---|---|---|
| Li/K | 0.58 | 1,400 | 1.0 | 0.75 | 1.27 | 11.7 |
| Li/K | 0.58 | 1,500 | 1.0 | 0.75 | 1.37 | 12.5 |
| Li/Na | 0.92 | 1,200 | 2.2 | 2.25 | 0.77 | 2.4 |
| Li/Na | 0 92 | 1,300 | 2.2 | 2.25 | 0.94 | 2.9 |
| Li/Na | 0.92 | 1,400 | 2.2 | 2.25 | 0.99 | 3.0 |
| Li/Na | 0.48 | 1,200 | 1.2 | 0.5 | 4.12 | 56.7 |
| Li/Na | 0.48 | 1,400 | 1.2 | 0.5 | 4.98 | 68.0 |

The results given in Table XI indicate that for both Li/K and Li/Na melts, the desulfurization rate increases only slightly with increasing temperature.

EXAMPLE 11

Effect of Initial Sulfur Concentration

TABLE XII

Melt: Li/Na borate (60/40)
Temp.: 1,300° F.
Steam feed rate: 1.25 g./min. R No.: 2.2
Basicity: .92

| Melt, g. | $Na_2S$, g. | Sulfur in melt, wt. percent | Desulfurization rate, percent/min. | Initial steam conversion, percent |
|---|---|---|---|---|
| 450 | 30 | 2.56 | 0.37 | 2.0 |
| 450 | 60 | 4.80 | 0.31 | 3.5 |
| 225 | 30 | 4.80 | 0.55 | 3.1 |

Effect of initial sulfur concentration on sulfur regeneration has been investigated by changing the amount of melt and initial sulfur content. The results given in Table XII show that the specific desulfurization rate is not dependent on sulfur concentration and is constant provided the steam feed rate to melt volume is constant. Steam conversion is directly proportional to the sulfur concentration of the melt and is not affected by the amount of melt or sulfur present.

EXAMPLE 12

Effect of Superficial Gas Velocity on Sulfur Removal

TABLE XIII

Melt: 225 g. Li/Na borate (60/40)
$Na_2S$: 30 g.
Temp.: 1,300° F.
Basicity, R'=0.92, R No. 2.2

| Steam feed rate, g./min. | Superficial gas velocity, ft./sec. | Desulfurization rate, percent min. | Steam conv., percent |
|---|---|---|---|
| 0.75 | 0.15 | 0.26 | 2.27 |
| 1.25 | 0.25 | 0.55 | 3.07 |
| 1.50 | 0.30 | 0.54 | 2.47 |
| 2.25 | 0.45 | 0.94 | 2.89 |
| 2.75 | 0.58 | 0.95 | 2.39 |

The effect of superficial gas velocity (i.e., steam feed rate) on desulfurization has been studied in the range 0.1–0.58 ft./sec. The results summarized in Table XIII indicate that for a given initial sulfur concentration, the desulfurization rate increases linearly with the increase in superficial gas velocity; however, the steam conversion is not affected.

EXAMPLE 13

Effect of Melt Depth on Sulfur Removal

TABLE XIV

Melt: Li/Na borate (70/30)
Temp: 1,400° F.
Steam feed rate: 0.5 g./min.
Initial sulfur concentration in melt: 4.8 wt. percent
Basicity, R'=0.60, R No. 1.6

| Melt depth (inch) | Desulfurization rate, percent/min. | Rate of S regeneration, lb./ft.³/hr. | Stream conversion, percent |
|---|---|---|---|
| 3.8 | 2.20 | 8.49 | 30.4 |
| 7.6 | 1.03 | 3.99 | 28.5 |
| 11.4 | 0.71 | 2.74 | 29.4 |

The effect of melt depth on the desulfurization rate and steam conversion was investigated by keeping the initial sulfur concentration and steam feed rate constant but varying the melt depth. The results given in Table XIV indicate that the specific desulfurization rate and rate of sulfur regeneration (lb./ft.³/hr.) decreases with an increase in melt depth, but the steam conversion is not affected.

EXAMPLE 14

Sulfur Regeneration in Equilibrium Borate-Carbonate Melts

TABLE XV

Melt: 225 g. Li/Na borate
$Na_2S$: 30 g.
$H_2O$ feed rate: 0.5 g./min.
Temp.: 1,400° F.

| Basicity, R' | R No. | Mole percent carbonate in melt | Desulfurization rate, percent/min. | Initial steam conversion percent |
|---|---|---|---|---|
| 0.6 | 1.6 | 0 | 2.20 | 30.4 |
| 0.6 | 1.6 | 3 | 1.89 | 26.2 |
| 0.75 | 2.0 | 0 | 0.87 | 12.0 |
| 0.75 | 2.0 | 5 | 0.54 | 7.5 |

During contacting of carbonaceous materials, i.e., coke, with air in the burning zone, $CO_2$ will be absorbed by the glass-forming oxide melt to form carbonate, its equilibrium concentration depending on the basicity of the borate melt, temperature and carbon dioxide partial pressure. Sulfur regeneration in the equilibrium melts is shown in Table XV. The results in Table XV show that when an Li/Na borate melt containing sodium sulfide was saturated with $CO_2/N_2$ mixture (20% $CO_2$) to establish the equilibrium carbonate concentration, the desulfurization rate and steam conversion decreased slightly. The extent of the decrease depended on the carbonate content of the melt and was largest at high carbonate concentrations.

EXAMPLE 15

Sulfur Regeneration in the Presence of Ash

TABLE XVI

Melt: Li/Na borate
Temp.: 1,400° F.
Steam feed rate: 0.5 g./min.
Sulfur concentration: 4.8 wt. percent (as $Na_2S$)

| Basicity, R' | R No. | Ash, wt. percent | Desulfurization rate, percent/min. | Initial steam conversion, percent |
|---|---|---|---|---|
| 0.92 | 2.2 | Nil | 0.56 | 4.4 |
| 0.92 | 2.2 | a 4 | 0.24 | 1.9 |
| 0.75 | 2.0 | Nil | 0.87 | 12.0 |
| 0.75 | 2.0 | b 4 | 0.88 | 12.2 | a Oxide form.  b Sulfide form.

The effect of ash on steam desulfurization was evaluated since the ash present in hydrocarbonaceous materials that are processed in the molten media remain in the melt. The results in Table XVI show that ash in the oxide form decreases the desulfurization rate and the steam conversion whereas ash in the sulfided form has no effect. Once the ash is sulfided, as will be the case in the processes described herein, ash does not interfere with melt desulfurization.

EXAMPLE 16

Steam Desulfurization of Melts Containing Alkaline Earth Oxides

TABLE XVII

Melt: 225 g. (Li/alkaline earth mole ratio=4.1)
$Na_2S$: 30. g.
Steam feed rate: 0.5 g./min.
Temp.: 1,400° F., R No.=2.0

| Melt | Basicity, R' | Desulfurization rate, percent/min. | Initial steam conversion, percent |
|---|---|---|---|
| Li/Mg borate | 0.53 | 2.80 | 37.3 |
| Li/Ca borate | 0.51 | 3.07 | 42.5 |
| Li/Sr borate | 0.54 | 2.13 | 29.4 |
| Li/Ba borate | 0.60 | 1.28 | 17.7 |

The effect of alkaline earth metal oxides on the desulfurization reaction was determined in melts also containing lithium oxide in order to lower the melting point. The results in Table XVII indicate that these melts can be readily desulfurized.

EXAMPLE 17

Steam Desulfurization of Melt Containing In Situ Formed Sulfide (by $SO_2$ Absorption)

TABLE XVIII

Melt: 225 g. Li/Na borate (70/30)
Temp.: 1,400° F.
Steam feed rate: 0.5 g./min.
Sulfide content: 0.36–0.38 g.-moles (by $SO_2$ absorption).
R No. 2, R'=0.75

| Sulfur source | Desulfurization rate, percent/min. | |
|---|---|---|
| | Experimental | Predicted |
| $Na_2S$ | 0.87 | 0.76 |
| $Li_2S$ | 0.90 | 1.20 |
| $SO_2$ absorption plus reduction | 2.02 | 1.90 |

In order to demonstrate the desulfurization of a melt containing in situ formed alkali metal sulfides, sulfur dioxide was passed through a melt and the sulfites and sulfates formed were reduced with coke at 1400° F. This reduced melt was then steam treated. As the results in Table XVIII show the synthetically produced alkali metal sulfide and in situ formed sulfide are essentially equivalent and the desulfurization rate depends on the melt basicity.

EXAMPLE 18

Steam Desulfurization of Melt Containing In Situ Formed Sulfide (by $H_2S$ Absorption)

TABLE XIX

Melt: 225 g. Li/Na borate
Temp.: 1,400° F.
Steam feed rate: 0.5 g./min.
Sulfide content: 0.13–0.17 g.-moles (from $H_2S$ absorption)

| Melt basicity, R' | R No. | Desulfurization rate, percent/min. | |
|---|---|---|---|
| | | Experimental | Predicted |
| 0.75 | 2.0 | 1.62 | 1.90 |
| 0.54 | 1.4 | 5.51 | 7.00 |

In situ sulfide was formed directly by the absorption of hydrogen sulfide from a gaseous stream that was passed through the melt. The results in Table XIX show that the alkali metal sulfide formed in this manner reacts readily with steam with the desulfurization rate depending on melt basicity.

EXAMPLE 19

A heavy residua hydrocarbon feedstock containing materials boiling above 650° F. was introduced by means of a pump at a rate of about 2 grams per minute through a ¼ inch inlet tube into a reactor containing a molten medium consisting of boron oxide as the glass-forming oxide in combination with lithium oxide and potassium oxide as the alkali metal oxide component. The cracking zone was 2 inches in diameter and 12 inches in length, and was placed in a Lindberg furnace. The melt temperature was measured by a thermocouple inserted into a thermowell positioned in the center of the molten media connected to a portable pyrometer. The effluent gases were passed directly to a gas chromatograph for analysis. The quantity of $C_5^+$ liquid products and carbonaceous material, namely coke, produced was also measured.

TABLE XX

Cracking heavy hydrocarbon in regenerable molten medium

Melt: 0.3 $Li_2O$–0.47 $K_2O$–1.0 $B_2O_3$.
Temperature, ° F.: 1350.
Feed (grams): 85.
Pressure: Atm.

Product Yield, Wt. percent on Feed:

| | |
|---|---|
| Hydrogen | 0.5 |
| Methane | 10.8 |
| Ethylene | 17.2 |
| Ethane | 5.2 |
| Propane | 1.3 |
| Propylene | 17.0 |
| $C_3^-$ Conversion | 52.0 |
| Butanes | 0.4 |
| i-Butylene | 2.7 |
| n-Butylenes | 4.0 |
| Butadiene | 4.5 |
| Total $C_4$ | 11.6 |
| Total $C_5^+$ Liquid | 37.6 |
| Coke | 5.1 |
| Weight Balance | 106.3 |

As can be seen from the results as shown in Table XX, the cracking of a heavy hydrocarbon residual feedstock in the lithium oxide, potassium oxide, boron oxide melt of the instant invention results in a high conversion to $C_3^-$ products.

As discussed above, the carbonaceous particles which are formed during this cracking reaction become suspended in molten medium. The specific operating conditions employed and the results obtained in gasifying with air the carbonaceous materials which became suspended in the melt during the cracking operation described above are set forth in the following Table XXI.

TABLE XXI.—COKE GASIFICATION

| Melt | | 0.53 LiO$_2$–0.47 K$_2$O–1.0 B$_2$O$_3$ |
|---|---|---|
| Temperature, °F | 1,500 | 1,500 |
| Air flow rate (l./min.) | 0.5 | |
| Steam rate (gram/min.) | | 0.25 |
| Pressure | Atm. | Atm. |
| Effluent gas composition, mole percent: | | |
| H$_2$ | 0.0 | 74.6 |
| N$_2$ | 82.2 | 0.0 |
| O$_2$ | 15.8 | 0.0 |
| CO | 0.0 | 3.4 |
| CH$_4$ | 0.0 | 0.7 |
| CO$_2$ | 2.0 | 20.8 |
| H$_2$S | 0.0 | 0.5 |
| Sulfur in effluent (nanograms/cc.) | 10 | 400 |
| H$_2$O conversion, percent | | 7.7 |
| O$_2$ conversion, percent | 36 | |
| Percent coke gasified | 100 | 100 |
| Percent coke carried out of reactor | Nil | Nil |

As can be seen from the results as shown in Table XXI, the gasification of the carbonaceous material with steam results in a hydrogen-rich gaseous effluent, while the gasification of the carbonaceous material with air as the oxygen-containing gas stream results in a nitrogen-rich gaseous effluent. Furthermore, it can be seen that the carbonaceous materials were completely converted to their respective gaseous streams.

EXAMPLE 20

This example, wherein boron oxide is employed as the glass-forming oxide, indicates the effect of basicity and R number on the gasification rates when alkali oxides are employed in the alkali metal component of the melt.

TABLE XXII.—EFFECT OF ALKALI METAL BORATE MELT BASICITY ON COKE BURNING RATES

Melt, 490 g.; Air feed rate, 4 STP l./min.;
Coke, 20 g. fluid coke;
Melt pretreated with 4 l./min. 10% CO$_2$/N$_2$ for 1.5 hrs;
Temperature, 1,500° F.

| Melt | Mole ratio: Li$_2$O/Na$_2$O+K$_2$O | R No. | Basicity R' | Oxygen [1] conversion, percent | Coke burning [1] rate (lb./cu. ft./hr.) |
|---|---|---|---|---|---|
| Li/Na | 60/40 | 1.0 | 0.42 | 20 | 1.5 |
| Li/Na | 64/36 | 1.2 | 0.45 | 27 | 2.2 |
| Li/Na | 71/29 | 1.6 | 0.59 | 44 | 2.8 |
| Li/Na | 75/25 | 1.8 | 0.62 | 51 | 3.9 |
| Li/Na | 78/22 | 2.0 | 0.68 | 74 | 5.8 |
| Li/K | 53/47 | 1.0 | 0.55 | 48 | 3.7 |
| Li/K | 50/50 | 1.2 | 0.69 | 88 | 6.5 |
| Li/K | 65/35 | 1.6 | 0.76 | 89 | 7.1 |
| Li/K | 71/29 | 1.8 | 0.79 | 94 | 7.2 |
| Li/K | 77/23 | 2.0 | 0.80 | 96 | 7.6 |

[1] Initial conversion and rate.

As can be seen from the results as shown in Table XXII, excellent gasification rates are obtained when the basicity of the melt is above about 0.50 and the R number is above about 1.

What is claimed is:

1. A process for reducing the amount of sulfur in a molten media containing metal sulfides which comprises contacting said metal sulfides with steam in a molten media comprising a glass-forming oxide selected from the group consisting of oxides of boron, vanadium, silicon, tungsten, phosphorus and mixtures thereof in combination with an alkali metal compound selected from the group consisting of alkali metal oxides, alkali metal hydroxides, alkaline earth metal oxides, alkaline earth metal hydroxides and mixtures thereof wherein the mole ratio of the alkali metal compound expressed as the oxide thereof to the glass-forming oxide is below about 3 at a temperature in the range of from about above the melting point of the molten media to about 2000° F.

2. The process of claim 1 wherein the glass-forming oxide is an oxide of boron.

3. The process of claim 2 wherein the basicity of the molten media is in the range of from about 0.1 to about 1.5.

4. A process for removing sulfur from carbonaceous materials which comprises:
(a) contacting carbonaceous materials containing sulfur in a regenerable molten media containing a glass-forming oxide selected from the group consisting of oxides of boron, vanadium, silicon, tungsten, phosphorus and mixtures thereof in combination with an alkali metal compound selected from the group consisting of alkali metal oxides, alkali metal hydroxides, alkaline earth metal oxides, alkaline earth metal hydroxides, and mixtures thereof, wherein the mole ratio of the alkali metal compound expressed as the oxide thereof to the glass-forming oxide is below about 3 with oxygen at a temperature in the range of from above about the melting point of the molten media to about 3000° F. to form sulfur oxides;
(b) contacting the sulfur oxides formed in step (a) with a reducing agent to form reduced sulfur compounds and thereafter
(c) contacting said reduced sulfur compounds formed in step (b) with steam at a temperature in the range of from about 800° F. to about 2000° F. in order to form hydrogen sulfide as a recoverable product.

5. The process of claim 4 wherein the alkali metal is selected from the group consisting of sodium, potassium, lithium, cesium and mixtures thereof.

6. The process of claim 4 wherein the reducing agent contains carbon.

7. The process of claim 6 wherein the glass-forming oxide is an oxide of boron.

8. The process of claim 7 wherein the basicity of the molten media is in the range of from about 0.1 to about 1.5.

9. The process of claim 8 wherein the reduced sulfur compounds are metal sulfides selected from the group consisting of alkali metal sulfides, alkaline earth metal sulfides and mixtures thereof.

10. The process of claim 9 wherein the metal sulfide(s) is contacted with steam in the presence of a sulfur compound selected from the group consisting of alkali metal sulfates, alkaline earth metal sulfates and mixtures thereof and elemental sulfur is formed.

11. The process of claim 9 wherein the metal sulfide is contacted with steam in the presence of a sulfur compound selected from the group consisting of alkali metal sulfites, alkaline earth metal sulfites and mixtures thereof and elemental sulfur is formed.

12. The process of claim 9 wherein the metal sulfide is contacted with steam in the presence of sulfur dioxide and elemental sulfur is formed.

13. A process for removing sulfur from a hydrocarbon feedstock which comprises:
(a) contacting a hydrocarbon feedstock containing sulfur with a molten media containing a glass-forming oxide selected from the group consisting of oxides of boron, vanadium, phosphorus, tungsten, silicon and mixtures thereof in combination with an alkali metal compound selected from the group consisting of alkali metal oxides, alkali metal hydroxides, alkaline earth metal oxides, alkaline earth metal hydroxides and mixtures thereof wherein the mole ratio of the alkali metal compound expresses the oxide thereof to the glass-forming oxide is below about 3 at a temperature in the range of from above about the melting point of the molten media to about 2500° F. in order to form cracked hydrocarbon products and carbonaceous materials;
(b) contacting the carbonaceous materials in the molten media with oxygen at a temperature in the range of from above about the melting point of the molten media to about 3000° F. to form sulfur oxides;
(c) contacting the sulfur oxides formed in step (b) wherein said sulfur oxides are selected from the group consisting of alkali metal sulfates, alkali metal sulfites, alkaline earth metal sulfates, alkaline earth metal sulfites and mixtures thereof with a reducing agent to reduce the sulfur oxides to their sulfide form; and (d) thereafter contacting said sulfides with steam at a temperature in the range of from about 800° F. to about 2000° F. in order to form hydrogen sulfide as a recoverable product and to regenerate the molten media.

14. The process of claim 13 wherein the mole ratio of the alkali metal compound expressed as the oxide thereof to the glass-forming oxide is in the range of from about 0.5 to about 2.0

15. The process of claim 14 wherein the temperature of the molten media is maintained in the range of from about 1200° F. to about 2000° F.

16. The process of claim 15 wherein said sulfides are contacted with steam at a temperature in the range from about 1200° F. to about 2000° F.

17. The process of claim 16 wherein the glass-forming oxide is an oxide of boron and wherein the basicity of the molten media is maintained in the range of from about 0.1 to about 1.5.

18. The process of claim 17 wherein the basicity of the molten media is maintained in the range of from about 0.4 to about 1.0.

19. The process of claim 18 wherein the sulfides are contacted with steam in the presence of an alkali metal sulfate and elemental sulfur is formed.

20. The process of claim 3 wherein the alkali metal is selected from the group consisting of sodium, potassium, lithium, cesium and mixtures thereof.

21. The process of claim 20 wherein the molten media contains up to about 10 wt. percent sulfur.

22. The process of claim 8 wherein the carbonaceous materials contain from about 1 to about 10 wt. percent sulfur.

23. The process of claim 8 wherein the carbonaceous material is coal.

24. A process for removing sulfur from a heavy hydrocarbon feedstock which comprises:

(a) contacting at a temperature in the range of from about 1200° F. to about 2000° F. a heavy hydrocarbon feedstock containing from about 1 to about 10 wt. percent sulfur with a molten media containing boron oxide in combination with an alkali metal compound selected from the group consisting of sodium oxide, lithium oxide, sodium hydroxide, lithium hydroxide and mixtures thereof wherein the basicity of the molten media is maintained in the range of from about 0.3 to about 1.0 in order to form cracked hydrocarbon products and carbonaceous materials;

(b) contacting the molten media containing the carbonaceous materials with oxygen at a temperature in the range of from about 1200° F. to about 2000° F. to form sulfur compounds selected from the group consisting of alkali metal sulfates, alkali metal sulfites and mixtures thereof;

(c) contacting the sulfur compounds formed in step (b) with carbon to reduce a portion of the sulfur compounds to their sulfide form; and thereafter (d) contacting said sulfides with steam at a temperature in the range of from about 1200° to about 2000° F. in order to form hydrogen sulfide as a recoverable product and to regenerate the molten media.

References Cited

UNITED STATES PATENTS

| | | | |
|---|---|---|---|
| 3,440,164 | 4/1969 | Aldridge | 208—218 |
| 3,387,941 | 6/1968 | Murphy et al. | 208—230 |
| 3,081,256 | 3/1963 | Hendal et al. | 208—125 |
| 3,553,279 | 11/1971 | Bawa | 260—683 |
| 3,480,689 | 11/1969 | Bohrer | 260—683 |

FOREIGN PATENTS 386,669  9/1933  Great Britain _____ 260—683 R

HERBERT LEVINE, Primary Examiner